A. W. LARISON.
TRAP.
APPLICATION FILED NOV. 4, 1910.
1,067,526. Patented July 15, 1913.
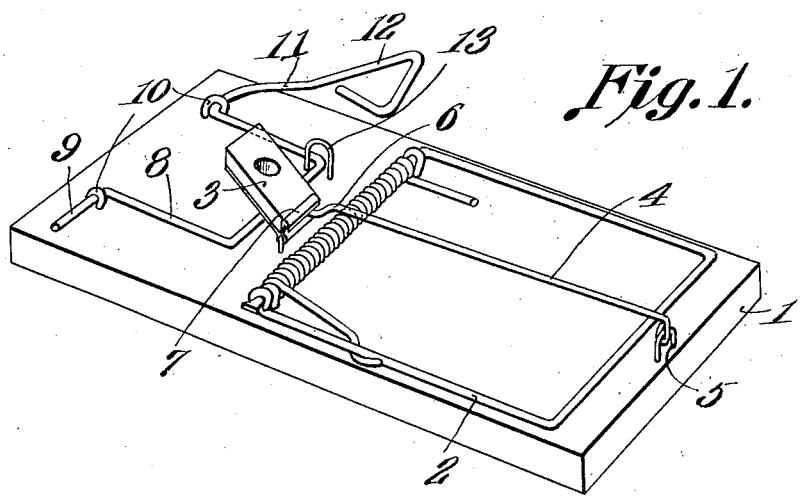
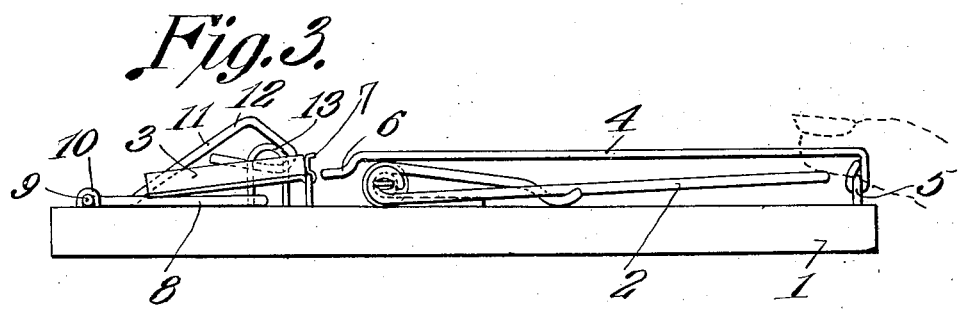
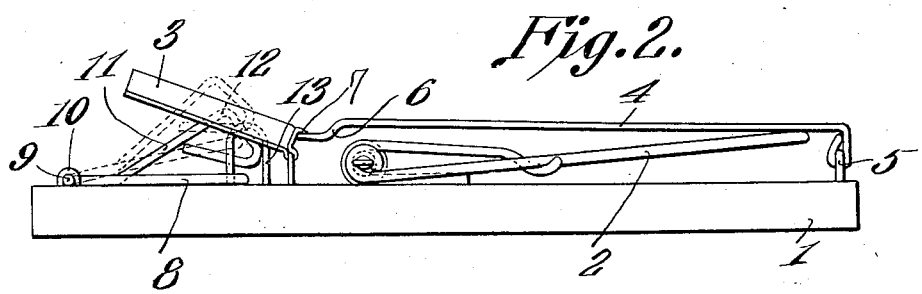
Witnesses
A. W. Larison,
Inventor
by C. A. Snow & Co.
Attorneys

UNITED STATES PATENT OFFICE.

ALONZO W. LARISON, OF LINCOLN, ILLINOIS.

TRAP.

1,067,526. Specification of Letters Patent. Patented July 15, 1913.

Application filed November 4, 1910. Serial No. 590,680.

*To all whom it may concern:*

Be it known that I, ALONZO W. LARISON, a citizen of the United States, residing at Lincoln, in the county of Logan and State of Illinois, have invented a new and useful Trap, of which the following is a specification.

This invention relates to spring traps for catching rodents and other small animals and wherein a spring actuated jaw is employed, said jaw being held by a wire or similar device engaging a bait holder. Devices of this character have heretofore been objectionable because it has been difficult to set the jaw without danger of the said jaw becoming accidentally released and catching a finger of the person handling the trap.

One of the objects of the present invention is to provide simple means for use in connection with the trap and whereby the trap can be set with practically no danger from its accidental release.

With the foregoing and other objects in view which will appear as the description proceeds, the invention resides in the combination and arrangement of parts and in the details of construction hereinafter described and claimed, it being understood that changes in the precise embodiment of invention herein disclosed can be made within the scope of what is claimed without departing from the spirit of the invention.

In the accompanying drawings the preferred form of the invention has been shown.

In said drawings, Figure 1 is a perspective view of a trap embodying the present invention. Fig. 2 is a side elevation thereof. Fig. 3 is a view similar to Fig. 2 and showing the relative positions of the parts immediately prior to the engagement of the holding strip or wire with the bait holder or trigger.

Referring to the figures by characters of reference 1 designates the base strip of the trap, the same being provided with the usual spring actuated bail-shaped jaw 2, bait holder or trigger 3, and holding strip 4, said strip being pivotally connected to the block 1 as at 5 and having a hook 6 adapted to engage a lip 7 carried by the trigger. These features are all old in the art and therefore constitute no part of the present invention.

The present invention includes a lifting bail 8 having alining portions 9 bearing within small staples 10, eyes or the like engaging the block 1. An arm 11 extends from one end portion of the bail and terminates in a loop 12 constituting a finger piece which is located beyond one edge of the block 1. The intermediate portion of the bail 8 projects under the trigger 3 and is limited in its movement by a guide 13 which may be in the form of a staple as shown.

When it is desired to set the trap, bait is first placed on the trigger 3 and the jaw 2 is then swung onto the block 1 and the strip 4 moved thereover as shown in Fig. 3. While the parts are thus held, the finger piece 12 is elevated and the bail 8 will therefore press upwardly upon the trigger and cause the lip 7 to move into engagement with the hook 6, and, as the trigger is supported by the bail 8, there will be no danger of strip 4 becoming accidentally released. Moreover as the finger piece 12 is located beyond one edge of the block 1 it will be apparent that if the jaw should be swung from any cause, there will be no danger of its pinching a finger of the person holding the trap. After the trap has been placed upon its support, the finger piece can be lowered and bail 8 will therefore move downwardly away from the trigger, this movement being effected by gravity. When, therefore, the trigger is depressed by a rodent or other animal, the trap will be swung as easily as though no such attachment were employed for the reason that said setting attachment is entirely separate from the bait holder and in no wise retards its movement when the trap is being sprung.

While the attachment is particularly designed for use upon small spring traps such as used for catching mice and rats, it is to be understood that the same can be used equally as well upon larger traps of the same type.

What is claimed is:

1. The combination with a spring trap including a trigger, of revoluble means connected to the trap and normally spaced from the trigger and operable from a point of safety, for engaging the trigger and moving it to operative position.

2. The combination with a spring trap including a trigger, of revoluble means connected to the trap and operable from a point of safety for engaging and moving the trigger to operative position, said means being movable, when released, away from the trigger.

3. A trap including a jaw, means for holding the jaw set, said means including a trigger, and revoluble means connected to the trap and operable from a point of safety for shifting the trigger to operative position, said means being separate from the trigger and movable away therefrom when the trigger is set.

4. In a trap, the combination with a trigger, of revoluble means connected to the trap and normally spaced from the trigger and movable thereagainst from a point of safety to shift the trigger to operative position, said means being movable automatically to normal position.

In testimony that I claim the foregoing as my own, I have hereto affixed my signature in the presence of two witnesses.

ALONZO W. LARISON.

Witnesses:
  JENNIE E. SYLVESTER,
  LYNN R. PARKER.

---

Copies of this patent may be obtained for five cents each, by addressing the "Commissioner of Patents, Washington, D. C."